UNITED STATES PATENT OFFICE.

BERNARD CARPLES AND JOSEPH M. KOEHLER, OF NEW YORK, N. Y.

IMPROVEMENT IN PROCESSES OF TREATING ANIMAL BONES AND MAKING ARTIFICIAL WHALEBONES THEREFROM.

Specification forming part of Letters Patent No. 186,924, dated February 6, 1877; application filed December 19, 1876.

*To all whom it may concern:*

Be it known that we, BERNARD CARPLES and JOS. M. KOEHLER, of the city of New York, county of New York, and State of New York, have invented a new and useful Process of Imitating Whalebone from Bones of Animals, which process is fully set forth in the following specification.

The invention relates to that class of processes employed for treating bones to remove the earthy salts mixed with and adhering to the bones; also, in leaving the cartilaginous portions of the bones, and preparing them for the manufacture of artificial whalebone.

In carrying out our invention, take of muriatic acid, eighteen pounds; of soft water, forty pounds, to one hundred pounds of bones. Let the mass boil for five hours, when the salts will be entirely removed without injury to the cartilage, which is then placed in fresh cold water for two hours, and repeated five times, until thoroughly washed, after which operation the bones are cut into shapes and sizes and pressed until dry, after which process the so cut bones will appear transparent, hard, and pliable, and not inferior to whalebone.

We are aware that muriatic acid has before been used to dissolve bones; but in all previous processes, so far as we are aware, the acid has been used in a cold state, and never for the purpose of substituting whalebone, as described in our specification.

We claim as our invention—

The process herein described for the production of an artificial whalebone, which consists in removing the earthy salts from the bones by boiling in an acid-bath, repeatedly washing in cold water, shaping into sizes, and finally pressing until dry, substantially as set forth.

BERNARD CARPLES.
JOSEPH M. KOEHLER.

Witnesses:
JOSEPH KOHN,
OSCAR BAUMANN.